(12) United States Patent
Shiraishi

(10) Patent No.: US 8,196,358 B2
(45) Date of Patent: Jun. 12, 2012

(54) WIND TURBINE GENERATOR TOWER

(75) Inventor: Yasuaki Shiraishi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/868,460

(22) Filed: Aug. 25, 2010

(65) Prior Publication Data
US 2011/0138729 A1 Jun. 16, 2011

(51) Int. Cl.
*E04H 12/00* (2006.01)
*E04C 3/00* (2006.01)
(52) U.S. Cl. .................. 52/40; 52/831; 52/845; 52/848; 52/851; 52/852; 52/854; 52/855; 52/651.01; 52/655.1
(58) Field of Classification Search ............... 52/40, 831, 52/845, 848, 851, 852, 854, 855, 651.01, 52/655.1
See application file for complete search history.

(56) References Cited

U.S. PATENT DOCUMENTS

| | | | | |
|---|---|---|---|---|
| 6,732,906 | B2* | 5/2004 | Andersen | 228/145 |
| 6,957,518 | B1* | 10/2005 | Koch, Jr. | 52/849 |
| 7,360,340 | B2* | 4/2008 | Grundman et al. | 52/40 |
| 7,387,497 | B2* | 6/2008 | Cone | 416/244 R |
| 7,464,512 | B1* | 12/2008 | Perina | 52/651.01 |
| 7,877,935 | B2* | 2/2011 | Ollgaard | 52/40 |
| 2006/0228218 | A1* | 10/2006 | Cone | 416/244 A |
| 2006/0236648 | A1* | 10/2006 | Grundman et al. | 52/726.4 |
| 2009/0021019 | A1* | 1/2009 | Thomsen | 290/55 |
| 2010/0242406 | A1* | 9/2010 | Oliphant et al. | 52/846 |
| 2011/0179623 | A1* | 7/2011 | Smith et al. | 29/428 |

FOREIGN PATENT DOCUMENTS
JP 09-291782 A 11/1997
* cited by examiner

*Primary Examiner* — Mark Wendell
(74) *Attorney, Agent, or Firm* — Kanesaka Berner & Partners

(57) ABSTRACT

A wind turbine generator tower is configured by arranging and connecting a plurality of approximately cylindrical tower sections in their axial direction. Each of the tower sections includes an approximately cylindrical tower section main body, and a plurality of approximately flat-plate protruding parts that are formed so as to protrude along the axial direction at at least an axis-wise end portion of the tower section main body on an outer circumferential surface and/or an inner circumferential surface of the tower section main body. The plurality of tower sections are connected when the protruding parts of one of the tower sections and the protruding parts of another one of the tower sections are friction-jointed with fastening means.

10 Claims, 12 Drawing Sheets

WIND TURBINE GENERATOR TOWER

BACKGROUND OF THE INVENTION

1. Field of the Invention

The present invention relates to a wind turbine generator tower.

2. Description of Related Art

In general, a wind turbine generator tower is constructed by arranging and connecting a plurality of approximately cylindrical tower sections in their axial direction. This is because it is difficult to carry the wind turbine generator tower in the assembled state, which has a height of several tens of meters, to a construction site. Therefore, the tower sections formed to have portable sizes are carried to the construction site of the wind turbine generator and are connected at the construction site to construct the tower.

Flanges are usually provided at axis-wise end portions of the respective tower sections, and, in a state where the axis-wise end portions of the tower sections face each other, the flanges lying on top of each other are fastened by bolts to connect the tower sections.

However, when the flanges' are provided at the ends of the respective tower sections in this way, the cost required to form the flanges is relatively high due to the high flatness required for the joint surfaces of the flanges, thus increasing the cost required to construct the wind turbine generator tower as well.

BRIEF SUMMARY OF THE INVENTION

The present invention has been made in view of the above-described circumstances, and an object thereof is to provide a wind turbine generator tower that is constructed by arranging and connecting a plurality of approximately cylindrical tower sections in their axial direction, the plurality of tower sections being easily connectable without providing flanges at the axis-wise end portions of the respective tower sections.

The present invention employs the following solutions in order to solve the above-mentioned problem.

According to the present invention, there is provided a wind turbine generator tower that is configured by arranging and connecting a plurality of approximately cylindrical tower sections in their axial direction, each of the tower sections including: an approximately cylindrical tower section main body; and a plurality of approximately flat-plate protruding parts that are formed so as to protrude along the axial direction at at least an axis-wise end portion of the tower section main body on an outer circumferential surface and/or an inner circumferential surface of the tower section main body, in which, among the plurality of tower sections, adjacent tower sections are connected when the protruding parts of one of the adjacent tower sections and the protruding parts of another adjacent tower section are friction-jointed with fastening means, directly or via splice plates.

According to the above-described wind turbine generator tower, adjacent tower sections are connected when the protruding parts of one of the adjacent tower sections and the protruding parts of the other adjacent tower section are friction-jointed with fastening means, directly or via splice plates; therefore it is not necessary to provide expensive flanges at axis-wise end portions of the respective tower sections in order to connect the plurality of tower sections.

Further, since the protruding parts of one tower section and the protruding parts of the other tower section are friction-jointed with the fastening means, when a bending force acts on the wind turbine generator tower due to the wind force etc., the fastening means gives just the fastening force that is required to produce a frictional force between the protruding parts. Therefore, an additional load is not imposed on the bolts, unlike in a case where flanges provided at axis-wise end portions of the tower sections are jointed by bolts.

Further, the protruding parts can serve a role of enhancing the rigidity of the tower section main bodies, in addition to the role of connecting the plurality of tower sections.

In the wind turbine generator tower according to the present invention, for example, the protruding parts are formed so as to extend along the whole axial length of the tower section main body.

According to the above-described wind turbine generator tower, the protruding parts that are formed so as to extend along the whole axial length of the tower section main body can improve the buckling resistance of the wind turbine generator tower.

As a result, the plate thickness of the tower section main body that is required to ensure the buckling resistance of the wind turbine generator tower can be relatively reduced, and thus the cost required to construct the wind turbine generator tower can be reduced.

Alternatively, in the wind turbine generator tower according to the present invention, the protruding parts are formed only at the axis-wise end portion of the tower section main body.

According to the above-described wind turbine generator tower, since the protruding parts, which are required to connect the plurality of tower sections, are formed only at the connection portions between the plurality of tower sections, the cost required to form the protruding parts can be minimized.

Here, it is preferable that the protruding parts be formed to have a protrusion height that is gradually reduced from an axis-wise end of the tower section main body toward an axis-wise center thereof. With this configuration, stress transferred between the tower section main body and the protruding parts can be prevented from being concentrated at a particular location.

Further, in the wind turbine generator tower according to the present invention, for example, the protruding parts are formed on the inner circumferential surface of the tower section main body.

According to this wind turbine generator tower, since the plurality of tower sections are connected when the protruding parts formed on the inner circumferential surfaces of the tower section main bodies are friction-jointed with the fastening means, the friction-jointed portions cannot be seen from outside the wind turbine generator tower, and thus the outer appearance of the wind turbine generator tower can be kept simple.

Alternatively, in the wind turbine generator tower according to the present invention, the protruding parts are formed on the outer circumferential surface of the tower section main body.

According to this wind turbine generator tower, since the plurality of tower sections are connected when the protruding parts formed on the outer circumferential surfaces of the tower section main bodies are friction-jointed with the fastening means, the protruding parts can be reduced in cross section compared with the case where the protruding parts are formed on the inner circumferential surfaces of the tower section main bodies. As a result, the number of fastening means required for the friction joints can be reduced.

Also, since the plurality of tower sections are connected when the protruding parts formed on the outer circumferential surfaces of the tower section main bodies are friction-jointed with the fastening means, a large usage space can be provided in the wind turbine generator tower.

Further, the protruding parts formed on the outer circumferential surfaces of the tower section main bodies can be utilized as supporting members for providing work platforms etc. on the outer side of the wind turbine generator tower.

Alternatively, in the wind turbine generator tower according to the present invention, the protruding parts are formed on the outer circumferential surface and the inner circumferential surface of the tower section main body.

According to this wind turbine generator tower, since the surfaces of the friction joints using the fastening means are separately provided on the inner circumferential surface sides and the outer circumferential surface sides of the tower sections, stress concentration can be reduced in the wind turbine generator tower.

In the wind turbine generator tower according to the present invention, for example, it is preferable that the protruding parts of the one tower section and the protruding parts of the other tower section be disposed such that end faces of the protruding parts of the one tower section and end faces of the protruding parts of the other tower section face each other; and each of the protruding parts of the one tower section and each of the protruding parts of the other tower section be friction-jointed with the fastening means via the splice plates that are provided so as to cover the facing portions of the two protruding parts.

According to this wind turbine generator tower, the protruding parts of one tower section and the protruding parts of the other tower section can be easily connected through friction jointing using the fastening means.

Further, since the cores of the protruding parts of one tower section and those of the protruding parts of the other tower section are aligned in position, torsion etc. does not occur when a force is transferred between the tower sections.

Alternatively, in the wind turbine generator tower according to the present invention, it is preferable that the protruding parts of at least one of the one tower section and the other tower section protrude in the axial direction farther than the axis-wise end portion of the tower section main body such that the protruding parts of the one tower section partially overlap with the protruding parts of the other tower section; and the overlapping portions of the protruding parts of the one tower section and the protruding parts of the other tower section be directly friction-jointed with the fastening means.

According to this wind turbine generator tower, when the protruding parts of one tower section and the protruding parts of the other tower section are directly friction-jointed with the fastening means, it is not necessary to use splice plates. Therefore, the cost required to connect the tower sections can be reduced.

In the wind turbine generator tower according to the present invention, it is preferable to further include a helical fin attached on the outer surfaces of the tower sections.

According to this wind turbine generator tower, it is possible to suppress the occurrence of the vortex-induced oscillation in the wind turbine generator tower due to the Kaman vortex occurring when wind strikes the wind turbine generator tower.

DETAILED DESCRIPTION OF THE INVENTION

Wind turbine generator towers according to embodiments of the present invention will be described below with reference to the drawings.

First, a description will be given of an outline of the wind turbine generator towers, common to the respective embodiments to be described below.

Figure 1:
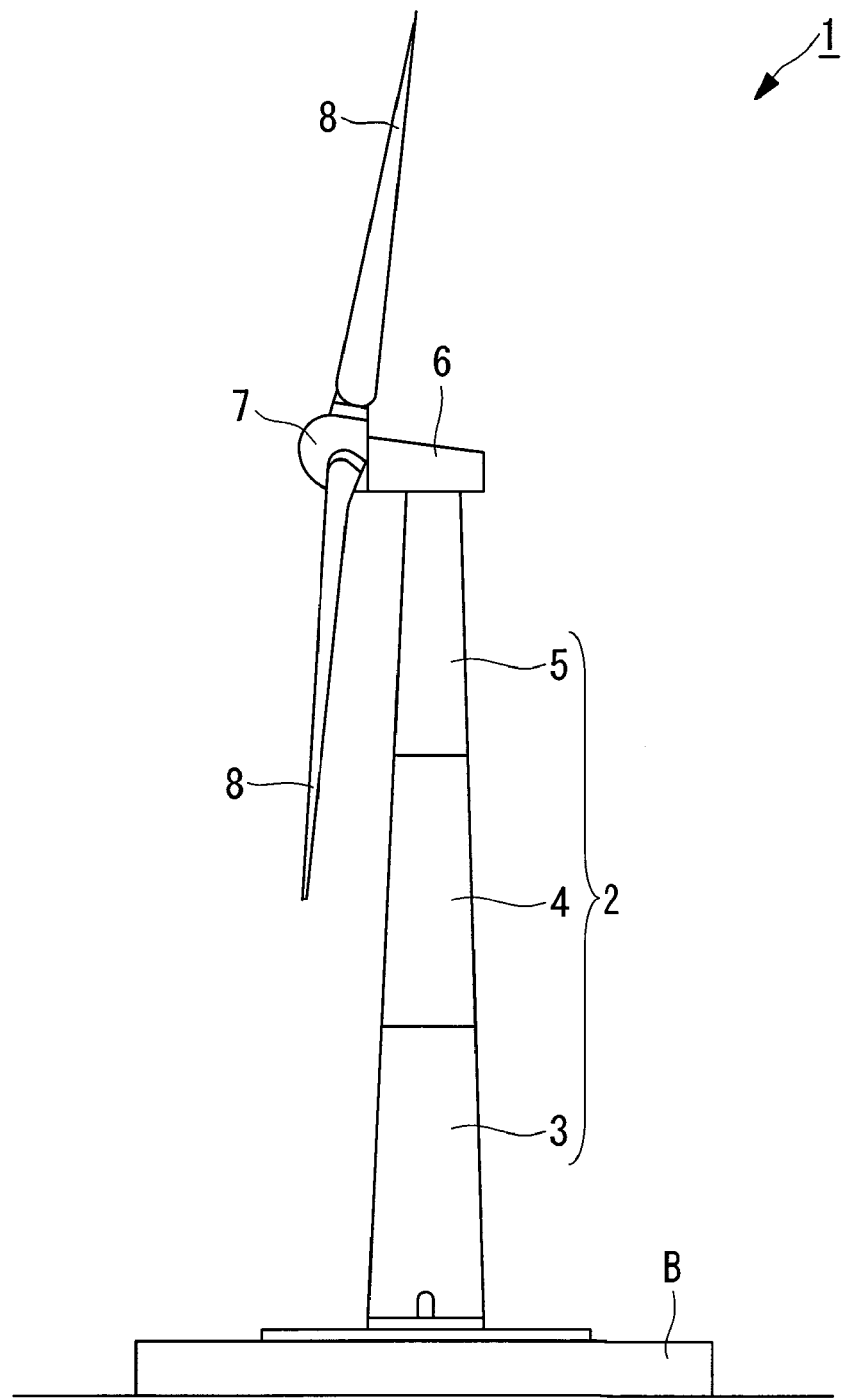
FIG. 1 is a side view showing, in outline, a wind turbine generator.

As shown in FIG. 1, a wind turbine generator 1 includes a tower 2 that is provided upright on a base B, a nacelle 6 that is provided at the top of the tower 2, and a rotor head 7 that is supported on a front end of the nacelle 6 so as to be able to rotate about an approximately horizontal rotational axis.

A plurality of (for example, three) wind turbine vanes 8 are attached to the rotor head 7 in a radiating pattern around the rotational axis. Thus, the force of wind striking the wind turbine vanes 8 from the rotational-axis direction of the rotor head 7 is converted into power for rotating the rotor head 7 about the rotational axis.

Then, the rotor head 7 rotating about the approximately horizontal rotational axis with the wind turbine vanes 8 receiving the force of wind drives a power generator (not shown) disposed in the nacelle 6 to generate power. The nacelle 6 is disposed on the tower 2, provided upright on the ferroconcrete base B, so as to be able to yaw with respect to the tower 2.

The wind turbine generator tower 2 is constructed to have an approximately cylindrical shape with a required length (height) by arranging and connecting approximately cylindrical tower sections 3, 4, and 5 in the axial direction thereof.

First Embodiment

Figure 2:
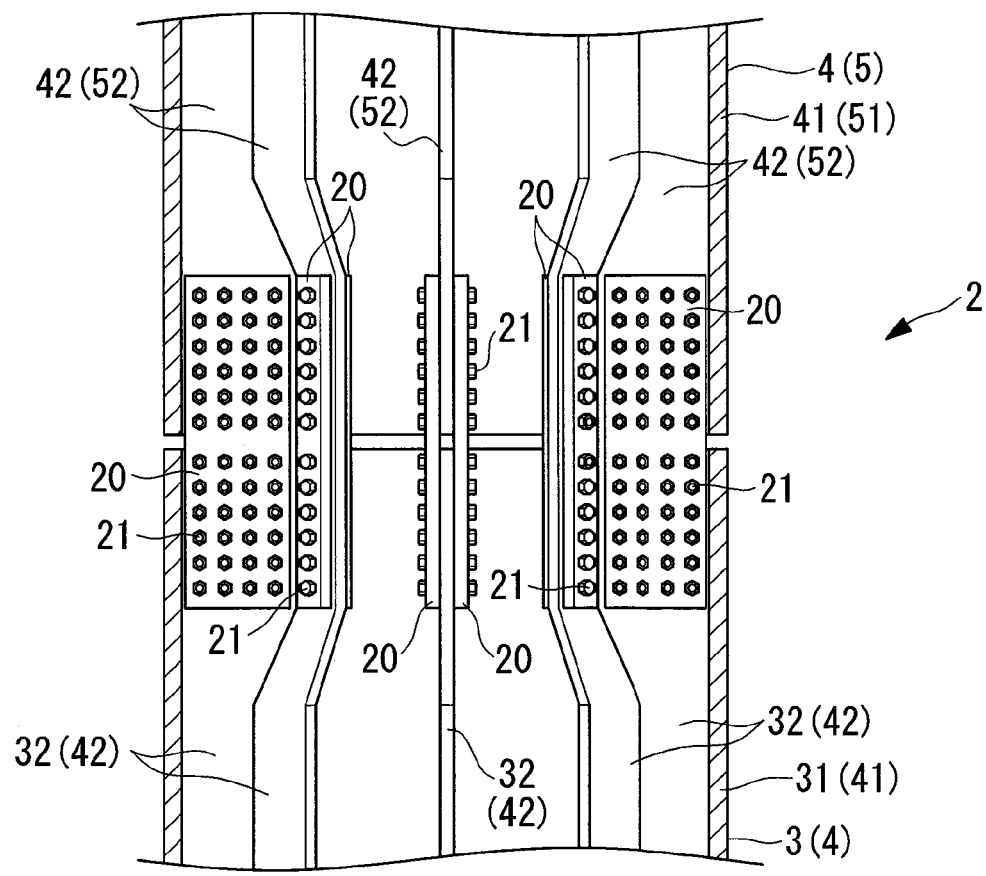
FIG. 2 is a sectional view showing a connection portion between tower sections in a wind turbine generator tower according to a first embodiment of the present invention.

FIG. 2 is a sectional view showing a connection portion between the tower section 3 and the tower section 4 (or between the tower section 4 and the tower section 5) in the wind turbine generator tower 2 according to a first embodiment of the present invention.

As shown in FIG. 2, the tower sections 3, 4, and 5 constituting the wind turbine generator tower 2 respectively include approximately cylindrical tower section main bodies 31, 41, and 51, and eight approximately flat-plate-shaped longitudinal ribs (protruding parts) 32, 42, and 52 that are provided so as to protrude from the inner circumferential surfaces of the tower section main bodies 31, 41, and 51. In this embodiment, the eight longitudinal ribs 32, 42, and 52 are provided radially at regular intervals on the inner circumferential surfaces of the tower section main bodies 31, 41, and 51, respectively. The longitudinal ribs 32, 42, and 52 are formed so as to extend along the axial direction of the tower sections 3, 4, and 5 over the whole axial length of the tower section main bodies 31, 41, and 51, respectively.

The tower section 4 is disposed with respect to the tower section 3 such that end faces of the longitudinal ribs 32 of the tower section 3 and those of the longitudinal ribs 42 of the tower section 4 face each other. Then, each of the longitudinal ribs 32 of the tower section 3 and each of the longitudinal ribs 42 of the tower section 4 are friction-jointed by high-strength bolts (fastening means) 21 via two splice plates 20 that are provided so as to sandwich, from both sides, the facing portions of the two longitudinal ribs 32 and 42. In this way, when eight pairs of the longitudinal ribs 32 and 42 are friction-jointed by the high-strength bolts 21 via the splice plates 20, the tower section 4 is connected to the tower section 3.

In the same way, the tower section 5 is disposed with respect to the tower section 4 such that end faces of the longitudinal ribs 42 of the tower section 4 and those of the longitudinal ribs 52 of the tower section 5 face each other. Then, each of the longitudinal ribs 42 of the tower section 4 and each of the longitudinal ribs 52 of the tower section 5 are friction-jointed by the high-strength bolts 21 via two splice plates 20 that are provided so as to sandwich, from both sides, the facing portions of the two longitudinal ribs 42 and 52. In this way, when eight pairs of the longitudinal ribs 42 and 52 are friction-jointed by the high-strength bolts 21 via the splice plates 20, the tower section 5 is connected to the tower section 4.

Second Embodiment

Figure 3:
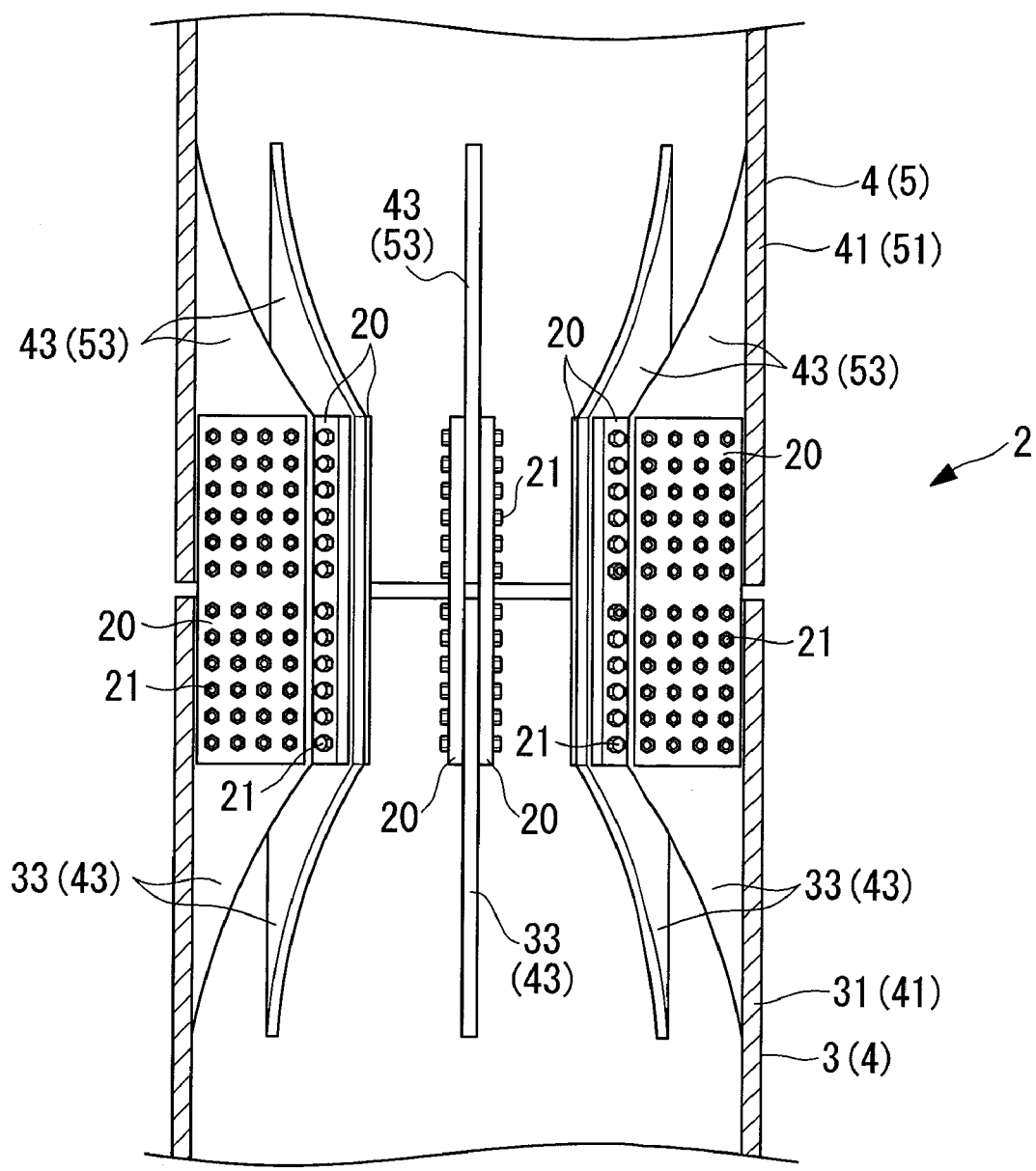
FIG. 3 is a sectional view showing a connection portion between tower sections in a wind turbine generator tower according to a second embodiment of the present invention.

FIG. 3 is a sectional view showing a connection portion between the tower section 3 and the tower section 4 (or between the tower section 4 and the tower section 5) in a wind turbine generator tower 2 according to a second embodiment of the present invention.

As shown in FIG. 3, the tower sections 3, 4, and 5 constituting the wind turbine generator tower 2 respectively include the approximately cylindrical tower section main bodies 31, 41, and 51, and approximately flat-plate-shaped coupling ribs (protruding parts) 33, 43, and 53 that are provided so as to protrude from the inner circumferential surfaces of the tower section main bodies 31, 41, and 51. In this embodiment, the eight coupling ribs 33, 43, and 53 are provided radially at regular intervals on the inner circumferential surfaces of the tower section main bodies 31, 41, and 51, respectively. The coupling ribs 33, 43, and 53 are formed so as to extend along the axial direction of the tower sections 3, 4, and 5 only at axis-wise end portions of the tower section main bodies 31, 41, and 51, and so as to have a fillet geometry fitting the tower section main bodies 31, 41, and 51, respectively.

The tower section 4 is disposed with respect to the tower section 3 such that end faces of the coupling ribs 33 of the tower section 3 and those of the coupling ribs 43 of the tower section 4 face each other. Then, each of the coupling ribs 33 of the tower section 3 and each of the coupling ribs 43 of the tower section 4 are friction-jointed by the high-strength bolts 21 via two splice plates 20 that are provided so as to sandwich, from both sides, the facing portions of the two coupling ribs 33 and 43. In this way, when eight pairs of the coupling ribs 33 and 43 are friction-jointed by the high-strength bolts 21 via the splice plates 20, the tower section 4 is connected to the tower section 3.

In the same way, the tower section 5 is disposed with respect to the tower section 4 such that end faces of the coupling ribs 43 of the tower section 4 and those of the coupling ribs 53 of the tower section 5 face each other. Then, each of the coupling ribs 43 of the tower section 4 and each of the coupling ribs 53 of the tower section 5 are friction-jointed by the high-strength bolts 21 via two splice plates 20 that are provided so as to sandwich, from both sides, the facing portions of the two coupling ribs 43 and 53. In this way, when eight pairs of the coupling ribs 43 and 53 are friction-jointed by the high-strength bolts 21 via the splice plates 20, the tower section 5 is connected to the tower section 4.

As shown in FIG. 3, the coupling ribs 33, 43, and 53 are each formed in a fillet geometry such that the protrusion height thereof is gradually reduced as the distance increases from a portion where the splice plates 20 are provided. Accordingly, the load is smoothly transferred between the tower section main bodies 31, 41, and 51 and the coupling ribs 33, 43, and 53, and thus stress concentration is relieved.

Third Embodiment

Figure 4:
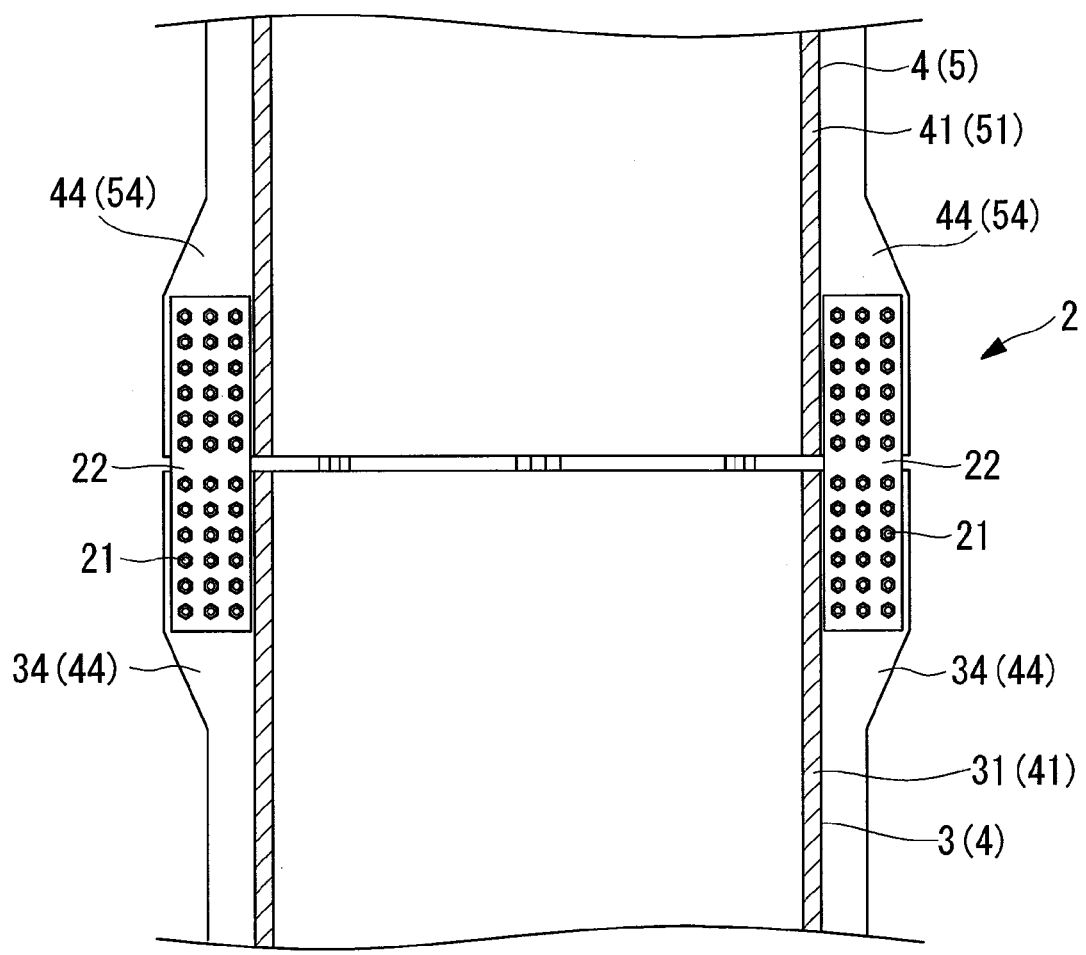
FIG. 4 is a sectional view showing a connection portion between tower sections in a wind turbine generator tower according to a third embodiment of the present invention.

FIG. 4 is a sectional view showing a connection portion between the tower section 3 and the tower section 4 (or between the tower section 4 and the tower section 5) in a wind turbine generator tower 2 according to a third embodiment of the present invention.

As shown in FIG. 4, the tower sections 3, 4, and 5 constituting the wind turbine generator tower 2 respectively include the approximately cylindrical tower section main bodies 31, 41, and 51, and eight approximately flat-plate-shaped longitudinal ribs (protruding parts) 34, 44, and 54 that are provided so as to protrude from the outer circumferential surfaces of the tower section main bodies 31, 41, and 51. In this embodiment, the eight longitudinal ribs 34, 44, and 54 are provided radially at regular intervals on the outer circumferential surfaces of the tower section main bodies 31, 41, and 51, respectively. The longitudinal ribs 34, 44, and 54 are formed so as to extend along the axial direction of the tower sections 3, 4, and 5 over the whole axial length of the tower section main bodies 31, 41, and 51, respectively.

The tower section 4 is disposed with respect to the tower section 3 such that end faces of the longitudinal ribs 34 of the tower section 3 and those of the longitudinal ribs 44 of the tower section 4 face each other. Then, each of the longitudinal ribs 34 of the tower section 3 and each of the longitudinal ribs 44 of the tower section 4 are friction-jointed by the high-strength bolts 21 via two splice plates 22 that are provided so as to sandwich, from both sides, the facing portions of the two longitudinal ribs 34 and 44. In this way, when eight pairs of the longitudinal ribs 34 and 44 are friction-jointed by the high-strength bolts 21 via the splice plates 22, the tower section 4 is connected to the tower section 3.

In the same way, the tower section 5 is disposed with respect to the tower section 4 such that end faces of the longitudinal ribs 44 of the tower section 4 and those of the longitudinal ribs 54 of the tower section 5 face each other. Then, each of the longitudinal ribs 44 of the tower section 4 and each of the longitudinal ribs 54 of the tower section 5 are friction-jointed by the high-strength bolts 21 via two splice plates 22 that are provided so as to sandwich, from both sides, the facing portions of the two longitudinal ribs 44 and 54. In this way, when eight pairs of the longitudinal ribs 44 and 54 are friction-jointed by the high-strength bolts 21 via the splice plates 22, the tower section 5 is connected to the tower section 4.

The longitudinal ribs 34, 44, and 54 are formed to have a protrusion height lower than that of the longitudinal ribs 32, 42, and 52 in the wind turbine generator tower 2 of the first embodiment. Also, the splice plates 22 are formed to have a width smaller than that of the splice plates 20 used in the first embodiment.

Figure 5:
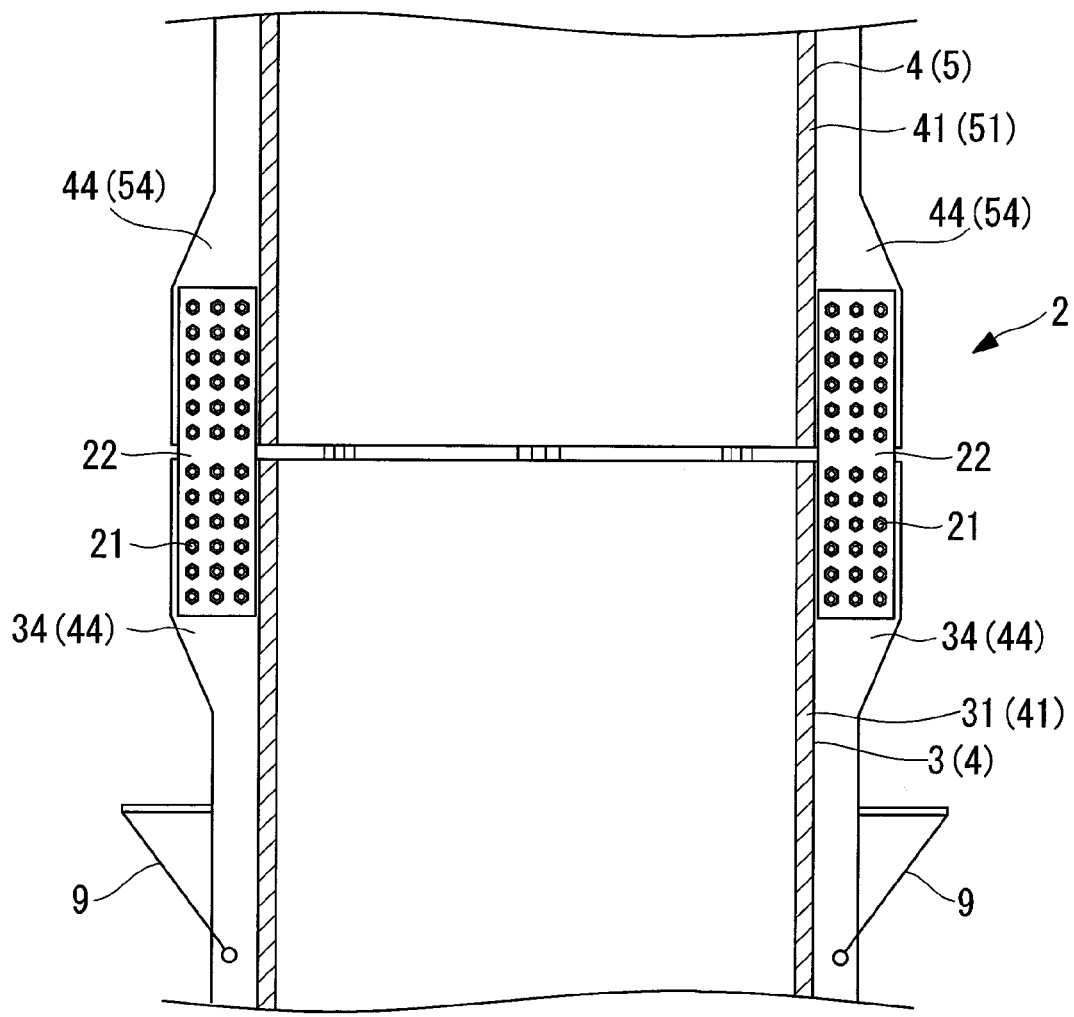
FIG. 5 is a sectional view showing a state where work platforms are attached to the wind turbine generator tower according to the third embodiment of the present invention.

In the wind turbine generator tower 2 of this embodiment, as shown in FIG. 5, work platforms 9 may be provided so as to be supported by the longitudinal ribs 34, 44, and 54, which are provided so as to protrude from the outer circumferential surfaces of the tower section main bodies 31, 41, and 51.

Fourth Embodiment

Figure 6:
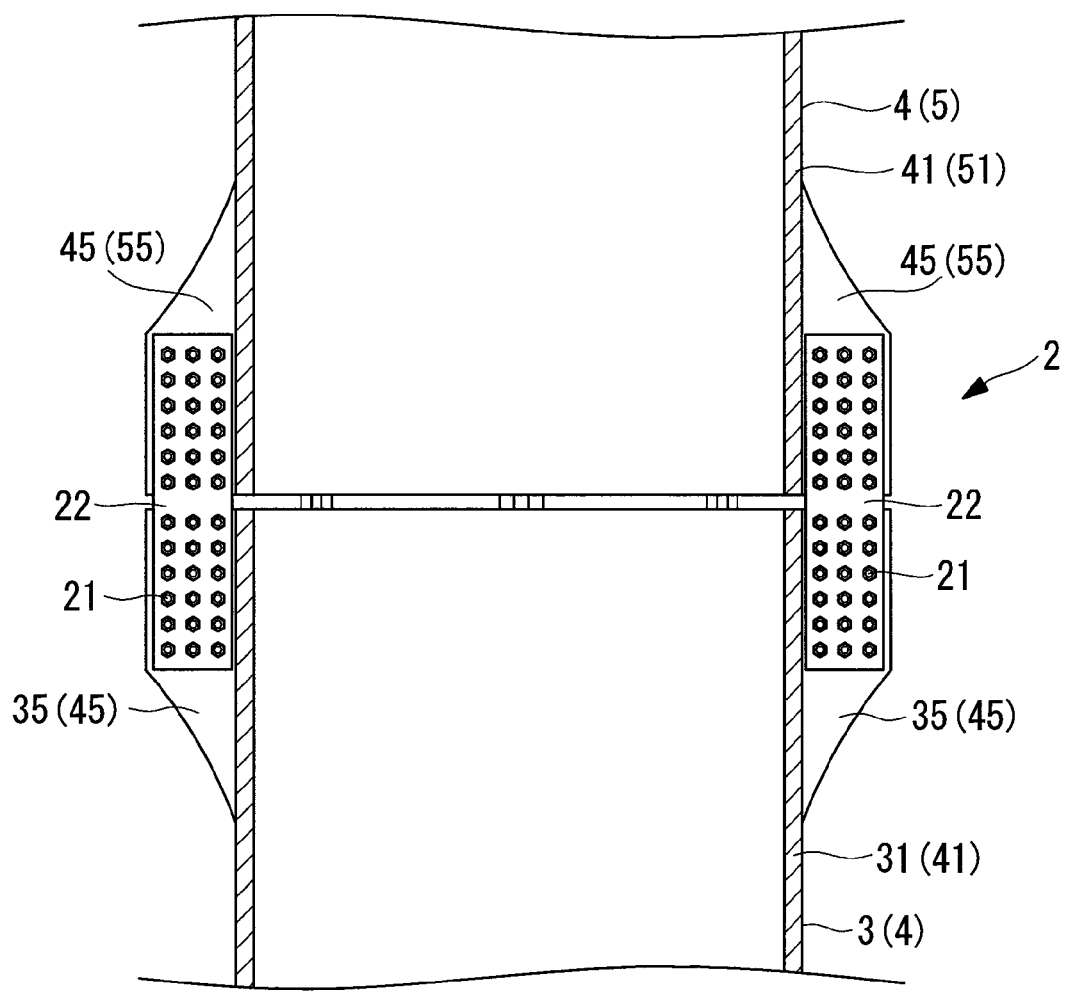
FIG. 6 is a sectional view showing a connection portion between tower sections in a wind turbine generator tower according to a fourth embodiment of the present invention.

FIG. 6 is a sectional view showing a connection portion between the tower section 3 and the tower section 4 (or between the tower section 4 and the tower section 5) in a wind turbine generator tower 2 according to a fourth embodiment of the present invention.

As shown in FIG. 6, the tower sections 3, 4, and 5 constituting the wind turbine generator tower 2 respectively include the approximately cylindrical tower section main bodies 31, 41, and 51, and approximately flat-plate-shaped coupling ribs (protruding parts) 35, 45, and 55 that are provided so as to protrude from the outer circumferential surfaces of the tower section main bodies 31, 41, and 51. In this embodiment, the eight coupling ribs 35, 45, and 55 are provided radially at regular intervals on the outer circumferential surfaces of the tower section main bodies 31, 41, and 51, respectively. The coupling ribs 35, 45, and 55 are formed so as to extend along the axial direction of the tower sections 3, 4, and 5 only at axis-wise end portions of the tower section main bodies 31, 41, and 51, and so as to have a fillet geometry fitting the tower section main bodies 31, 41, and 51, respectively.

The tower section 4 is disposed with respect to the tower section 3 such that end faces of the coupling ribs 35 of the tower section 3 and those of the coupling ribs 45 of the tower section 4 face each other. Then, each of the coupling ribs 35 of the tower section 3 and each of the coupling ribs 45 of the tower section 4 are friction-jointed by the high-strength bolts 21 via two splice plates 22 that are provided so as to sandwich, from both sides, the facing portions of the two coupling ribs 35 and 45. In this way, when eight pairs of the coupling ribs 35 and 45 are friction-jointed by the high-strength bolts 21 via the splice plates 22, the tower section 4 is connected to the tower section 3.

In the same way, the tower section 5 is disposed with respect to the tower section 4 such that end faces of the coupling ribs 45 of the tower section 4 and those of the coupling ribs 55 of the tower section 5 face each other. Then, each of the coupling ribs 45 of the tower section 4 and each of the coupling ribs 55 of the tower section 5 are friction-jointed by the high-strength bolts 21 via two splice plates 22 that are provided so as to sandwich, from both sides, the facing portions of the two coupling ribs 45 and 55. In this way, when eight pairs of the coupling ribs 45 and 55 are friction-jointed by the high-strength bolts 21 via the splice plates 22, the tower section 5 is connected to the tower section 4.

As shown in FIG. 6, the coupling ribs 35, 45, and 55 are each formed in a fillet geometry such that the protrusion height thereof is gradually reduced as the distance increases from a portion where the splice plates 22 are provided. Accordingly, the load is smoothly transferred between the tower section main bodies 31, 41, and 51 and the coupling ribs 35, 45, and 55, and thus stress concentration is relieved.

The coupling ribs 35, 45, and 55 can be formed to have a protrusion height lower than that of the coupling ribs 33, 43, and 53 in the wind turbine generator tower 2 of the second embodiment. Also, the splice plates 22 can be formed to have a width smaller than that of the splice plates 20 used in the second embodiment.

Fifth Embodiment

Figure 7:
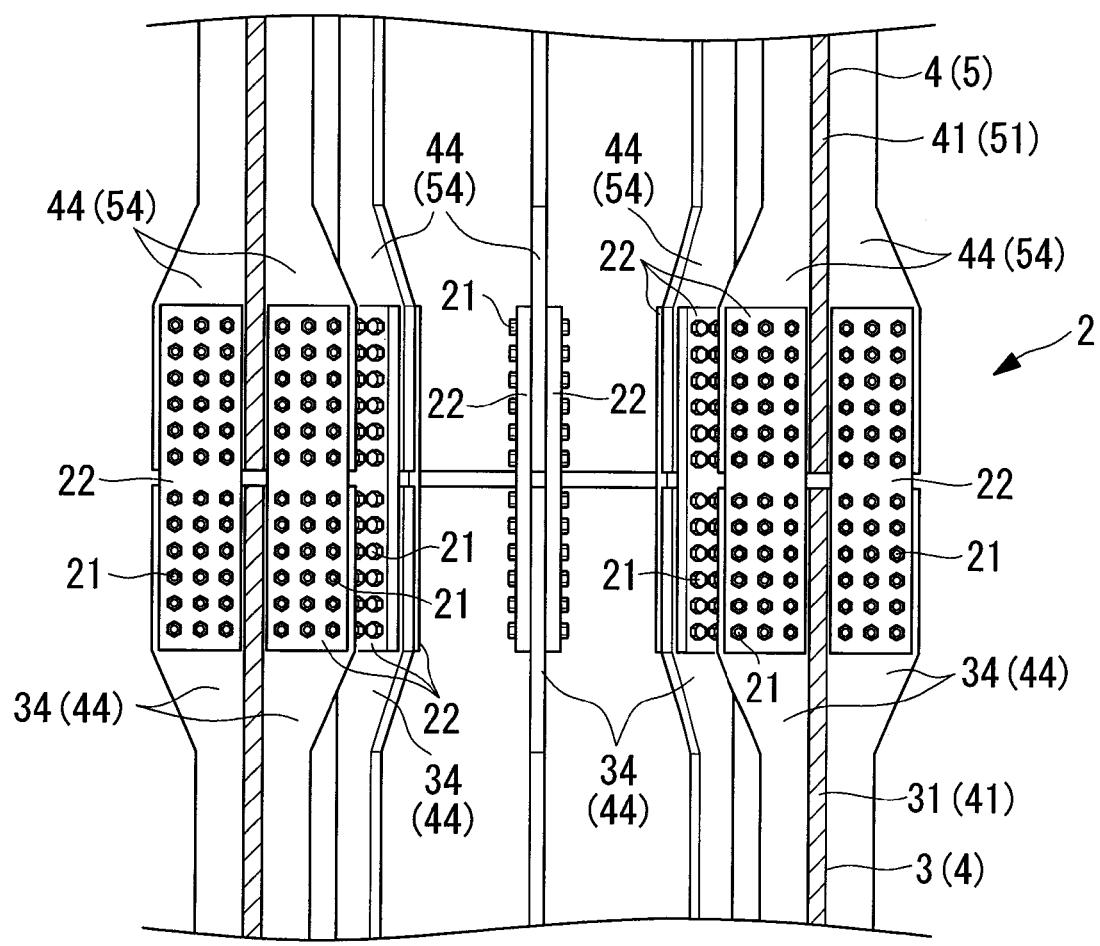
FIG. 7 is a sectional view showing a connection portion between tower sections in a wind turbine generator tower according to a fifth embodiment of the present invention.

FIG. 7 is a sectional view showing a connection portion between the tower section 3 and the tower section 4 (or between the tower section 4 and the tower section 5) in a wind turbine generator tower 2 according to a fifth embodiment of the present invention.

As shown in FIG. 7, the tower sections 3, 4, and 5 constituting the wind turbine generator tower 2 respectively include the approximately cylindrical tower section main bodies 31, 41, and 51, and 16 approximately flat-plate-shaped longitudinal ribs (protruding parts) 34, 44, and 54 that are provided so as to protrude from the outer circumferential surfaces and the inner circumferential surfaces of the tower section main bodies 31, 41, and 51. In this embodiment, of the 16 longitudinal ribs 34, 44, and 54, eight longitudinal ribs 34, 44, and 54 are provided radially at regular intervals on the outer circumferential surfaces of the tower section main bodies 31, 41, and 51, respectively, and the other eight longitudinal ribs 34, 44, and 54 are provided radially at regular intervals on the inner circumferential surfaces of the tower section main bodies 31, 41, and 51, respectively. The longitudinal ribs 34, 44, and 54 are formed so as to extend along the axial direction of the tower sections 3, 4, and 5 over the whole axial length of the tower section main bodies 31, 41, and 51, respectively.

The tower section 4 is disposed with respect to the tower section 3 such that end faces of the longitudinal ribs 34 of the tower section 3 and those of the longitudinal ribs 44 of the tower section 4 face each other. Then, each of the longitudinal ribs 34 of the tower section 3 and each of the longitudinal ribs 44 of the tower section 4 are friction-jointed by the high-strength bolts 21 via two splice plates 22 that are provided so as to sandwich, from both sides, the facing portions of the two longitudinal ribs 34 and 44. In this way, when 16 pairs of the longitudinal ribs 34 and 44 are friction-jointed by the high-strength bolts 21 via the splice plates 22, the tower section 4 is connected to the tower section 3.

In the same way, the tower section 5 is disposed with respect to the tower section 4 such that end faces of the longitudinal ribs 44 of the tower section 4 and those of the longitudinal ribs 54 of the tower section 5 face each other. Then, each of the longitudinal ribs 44 of the tower section 4 and each of the longitudinal ribs 54 of the tower section 5 are friction-jointed by the high-strength bolts 21 via two splice plates 22 that are provided so as to sandwich, from both sides, the facing portions of the two longitudinal ribs 44 and 54. In this way, when 16 pairs of the longitudinal ribs 44 and 54 are friction-jointed by the high-strength bolts 21 via the splice plates 22, the tower section 5 is connected to the tower section 4.

Sixth Embodiment

Figure 8:
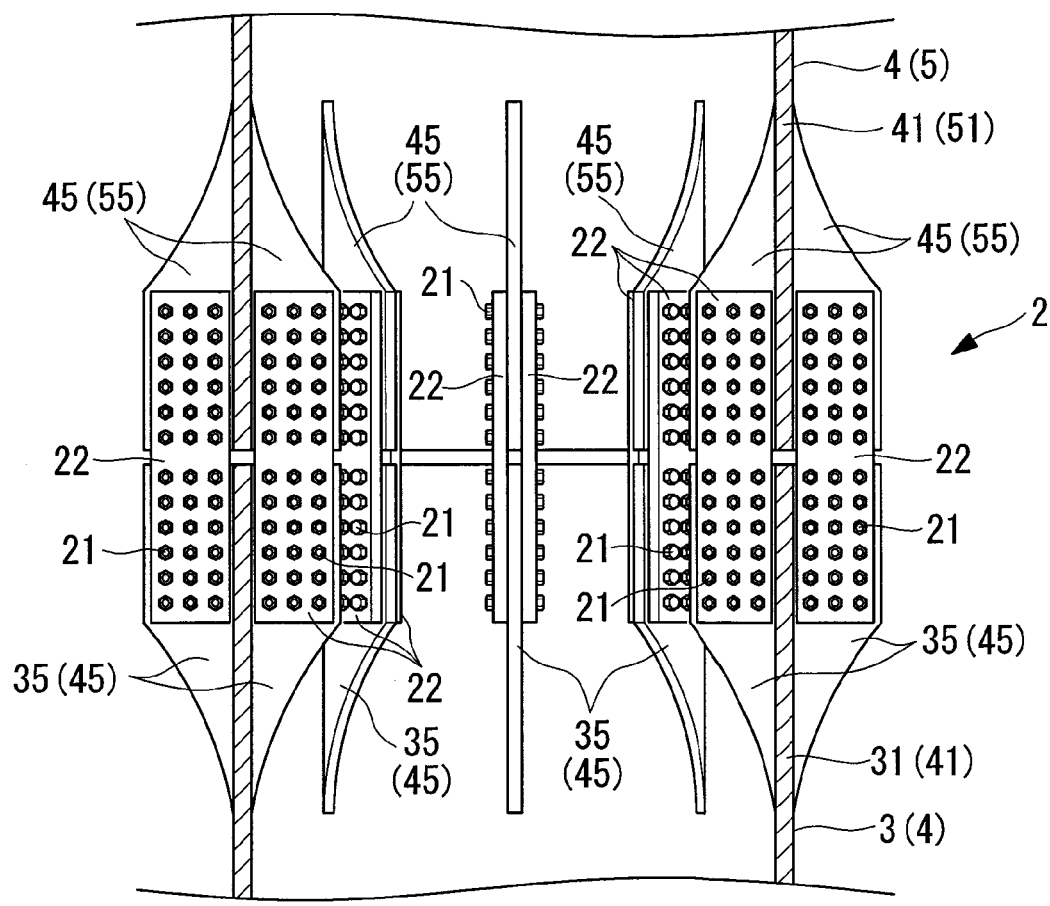
FIG. 8 is a sectional view showing a connection portion between tower sections in a wind turbine generator tower according to a sixth embodiment of the present invention.

FIG. 8 is a sectional view showing a connection portion between the tower section 3 and the tower section 4 (or between the tower section 4 and the tower section 5) in a wind turbine generator tower 2 according to a sixth embodiment of the present invention.

As shown in FIG. 8, the tower sections 3, 4, and 5 constituting the wind turbine generator tower 2 respectively include the approximately cylindrical tower section main bodies 31, 41, and 51, and approximately flat-plate-shaped coupling ribs (protruding parts) 35, 45, and 55 that are provided so as to protrude from the outer circumferential surfaces and the inner circumferential surfaces of the tower section main bodies 31, 41, and 51. In this embodiment, of the 16 coupling ribs 35, 45, and 55, eight coupling ribs 35, 45, and 55 are provided radially at regular intervals on the outer circumferential surfaces of the tower section main bodies 31, 41, and 51, respectively, and the other eight coupling ribs 35, 45, and 55 are provided radially at regular intervals on the inner circumferential surfaces of the tower section main bodies 31, 41, and 51, respectively. The coupling ribs 35, 45, and 55 are formed so as to extend along the axial direction of the tower sections 3, 4, and 5 only at axis-wise end portions of the tower section main bodies 31, 41, and 51, respectively.

The tower section 4 is disposed with respect to the tower section 3 such that end faces of the coupling ribs 35 of the tower section 3 and those of the coupling ribs 45 of the tower section 4 face each other. Then, each of the coupling ribs 35 of the tower section 3 and each of the coupling ribs 45 of the tower section 4 are friction-jointed by the high-strength bolts 21 via two splice plates 22 that are provided so as to sandwich, from both sides, the facing portions of the two coupling ribs 35 and 45. In this way, when 16 pairs of the coupling ribs 35 and 45 are friction-jointed by the high-strength bolts 21 via the splice plates 22, the tower section 4 is connected to the tower section 3.

In the same way, the tower section 5 is disposed with respect to the tower section 4 such that end faces of the coupling ribs 45 of the tower section 4 and those of the coupling ribs 55 of the tower section 5 face each other. Then, each of the coupling ribs 45 of the tower section 4 and each of the coupling ribs 55 of the tower section 5 are friction-jointed by the high-strength bolts 21 via two splice plates 22 that are provided so as to sandwich, from both sides, the facing portions of the two coupling ribs 45 and 55. In this way, when 16 pairs of the coupling ribs 45 and 55 are friction-jointed by the high-strength bolts 21 via the splice plates 22, the tower section 5 is connected to the tower section 4.

Seventh Embodiment

Figure 9:
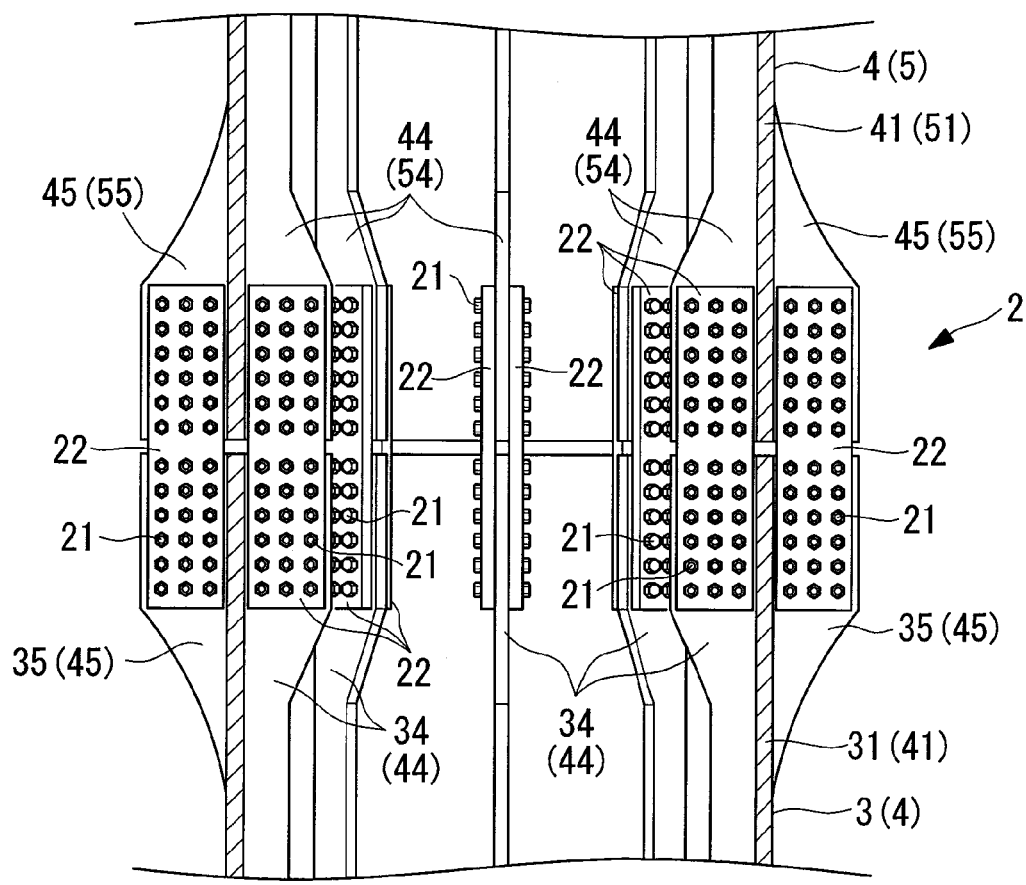
FIG. 9 is a sectional view showing a connection portion between tower sections in a wind turbine generator tower according to a seventh embodiment of the present invention.

FIG. 9 is a sectional view showing a connection portion between the tower section 3 and the tower section 4 (or between the tower section 4 and the tower section 5) in a wind turbine generator tower 2 according to a seventh embodiment of the present invention.

As shown in FIG. 9, the tower sections 3, 4, and 5 constituting the wind turbine generator tower 2 respectively include the approximately cylindrical tower section main bodies 31, 41, and 51; approximately flat-plate-shaped coupling ribs (protruding parts) 35, 45, and 55 that are provided so as to protrude from the outer circumferential surfaces of the tower section main bodies 31, 41, and 51; and approximately flat-plate-shaped longitudinal ribs (protruding parts) 34, 44, and 54 that are provided so as to protrude from the inner circumferential surfaces of the tower section main bodies 31, 41, and 51. In this embodiment, the eight coupling ribs 35, 45, and 55 are provided radially at regular intervals on the outer circumferential surfaces of the tower section main bodies 31, 41, and 51, respectively. Also, the eight longitudinal ribs 34, 44, and 54 are provided radially at regular intervals on the inner circumferential surfaces of the tower section main bodies 31, 41, and 51, respectively. The coupling ribs 35, 45, and 55 are formed so as to extend along the axial direction of the tower sections 3, 4, and 5 only at axis-wise end portions of the tower section main bodies 31, 41, and 51, respectively. The longitudinal ribs 34, 44, and 54 are formed so as to extend along the axial direction of the tower sections 3, 4, and 5 across the whole axial length of the tower section main bodies 31, 41, and 51, respectively.

The tower section 4 is disposed with respect to the tower section 3 such that end faces of the coupling ribs 35 of the tower section 3 and those of the coupling ribs 45 of the tower section 4 face each other, and end faces of the longitudinal ribs 34 of the tower section 3 and those of the longitudinal ribs 44 of the tower section 4 face each other. Then, each of the coupling ribs 35 of the tower section 3 and each of the coupling ribs 45 of the tower section 4 are friction-jointed by the high-strength bolts 21 via two splice plates 22 that are provided so as to sandwich, from both sides, the facing portions of the two coupling ribs 35 and 45. In the same way, each of the longitudinal ribs 34 of the tower section 3 and each of the longitudinal ribs 44 of the tower section 4 are friction-jointed by the high-strength bolts 21 via two splice plates 22 that are provided so as to sandwich, from both sides, the facing portions of the two longitudinal ribs 34 and 44. In this way, when eight pairs of the coupling ribs 35 and 45 and eight pairs of the longitudinal ribs 34 and 44 are friction-jointed by the high-strength bolts 21 via the splice plates 22, the tower section 4 is connected to the tower section 3.

In the same way, the tower section 5 is disposed with respect to the tower section 4 such that end faces of the coupling ribs 45 of the tower section 4 and those of the coupling ribs 55 of the tower section 5 face each other, and end faces of the longitudinal ribs 44 of the tower section 4 and those of the longitudinal ribs 54 of the tower section 5 face each other. Then, each of the coupling ribs 45 of the tower section 4 and each of the coupling ribs 55 of the tower section 5 are friction-jointed by the high-strength bolts 21 via two splice plates 22 that are provided so as to sandwich, from both sides, the facing portions of the two coupling ribs 45 and 55. In the same way, each of the longitudinal ribs 44 of the tower section 4 and each of the longitudinal ribs 54 of the tower section 5 are friction-jointed by the high-strength bolts 21 via two splice plates 22 that are provided so as to sandwich, from both sides, the facing portions of the two longitudinal ribs 44 and 54. In this way, when eight pairs of the coupling ribs 45 and 55 and eight pairs of the longitudinal ribs 44 and 54 are friction-jointed by the high-strength bolts 21 via the splice plates 22, the tower section 5 is connected to the tower section 4.

Eighth Embodiment

Figure 10:
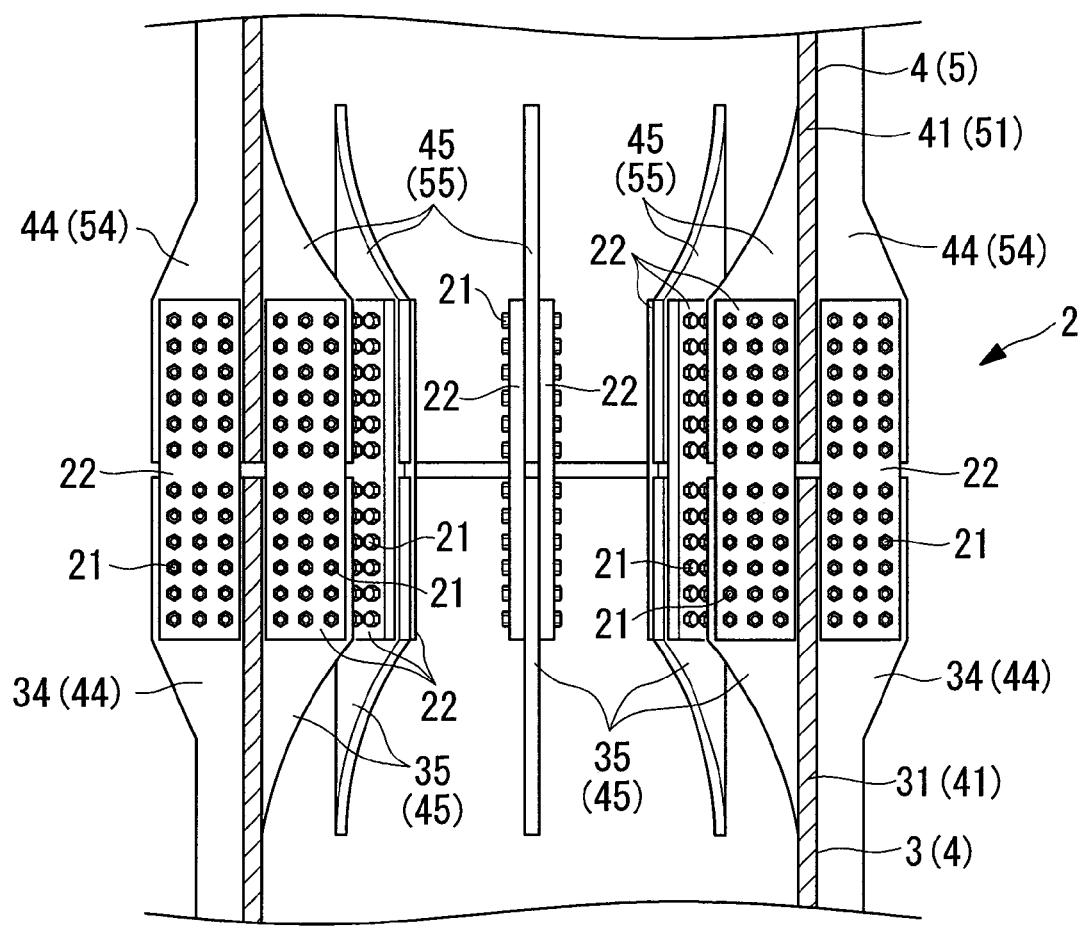
FIG. 10 is a sectional view showing a connection portion between tower sections in a wind turbine generator tower according to an eighth embodiment of the present invention.

FIG. 10 is a sectional view showing a connection portion between the tower section 3 and the tower section 4 (or between the tower section 4 and the tower section 5) in a wind turbine generator tower 2 according to an eighth embodiment of the present invention.

As shown in FIG. 10, the tower sections 3, 4, and 5 constituting the wind turbine generator tower 2 respectively include the approximately cylindrical tower section main bodies 31, 41, and 51; approximately flat-plate-shaped longitudinal ribs (protruding parts) 34, 44, and 54 that are provided so as to protrude from the outer circumferential surfaces of the tower section main bodies 31, 41, and 51; and approximately flat-plate-shaped coupling ribs (protruding parts) 35, 45, and 55 that are provided so as to protrude from the inner circumferential surfaces of the tower section main bodies 31, 41, and 51. In this embodiment, the eight longitudinal ribs 34, 44, and 54 are provided radially at regular intervals on the outer circumferential surfaces of the tower section main bodies 31, 41, and 51, respectively. Also, the eight coupling ribs 35, 45, and 55 are provided radially at regular intervals on the inner circumferential surfaces of the tower section main bodies 31, 41, and 51, respectively. The longitudinal ribs 34, 44, and 54 are formed so as to extend along the axial direction of the tower sections 3, 4, and 5 over the whole axial length of the tower section main bodies 31, 41, and 51, respectively. The coupling ribs 35, 45, and 55 are formed so as to extend along the axial direction of the tower sections 3, 4, and 5 only at axis-wise end portions of the tower section main bodies 31, 41, and 51, respectively.

The tower section 4 is disposed with respect to the tower section 3 such that end faces of the longitudinal ribs 34 of the tower section 3 and those of the longitudinal ribs 44 of the tower section 4 face each other, and end faces of the coupling ribs 35 of the tower section 3 and those of the coupling ribs 45 of the tower section 4 face each other. Then, each of the longitudinal ribs 34 of the tower section 3 and each of the longitudinal ribs 44 of the tower section 4 are friction-jointed by the high-strength bolts 21 via two splice plates 22 that are provided so as to sandwich, from both sides, the facing portions of the two longitudinal ribs 34 and 44. In the same way, each of the coupling ribs 35 of the tower section 3 and each of the coupling ribs 45 of the tower section 4 are friction-jointed by the high-strength bolts 21 via two splice plates 22 that are provided so as to sandwich, from both sides, the facing portions of the two coupling ribs 35 and 45. In this way, when eight pairs of the longitudinal ribs 34 and 44 and eight pairs of the coupling ribs 35 and 45 are friction-jointed by the high-strength bolts 21 via the splice plates 22, the tower section 4 is connected to the tower section 3.

In the same way, the tower section 5 is disposed with respect to the tower section 4 such that end faces of the longitudinal ribs 44 of the tower section 4 and those of the longitudinal ribs 54 of the tower section 5 face each other, and end faces of the coupling ribs 45 of the tower section 4 and those of the coupling ribs 55 of the tower section 5 face each other. Then, each of the longitudinal ribs 44 of the tower section 4 and each of the longitudinal ribs 54 of the tower section 5 are friction-jointed by the high-strength bolts 21 via two splice plates 22 that are provided so as to sandwich, from both sides, the facing portions of the two longitudinal ribs 44 and 54. In the same way, each of the coupling ribs 45 of the tower section 4 and each of the coupling ribs 55 of the tower section 5 are friction-jointed by the high-strength bolts 21 via two splice plates 22 that are provided so as to sandwich, from both sides, the facing portions of the two coupling ribs 45 and 55. In this way, when eight pairs of the longitudinal ribs 44 and 54 and eight pairs of the coupling ribs 45 and 55 are friction-jointed by the high-strength bolts 21 via the splice plates 22, the tower section 5 is connected to the tower section 4.

Ninth Embodiment

Figure 11:
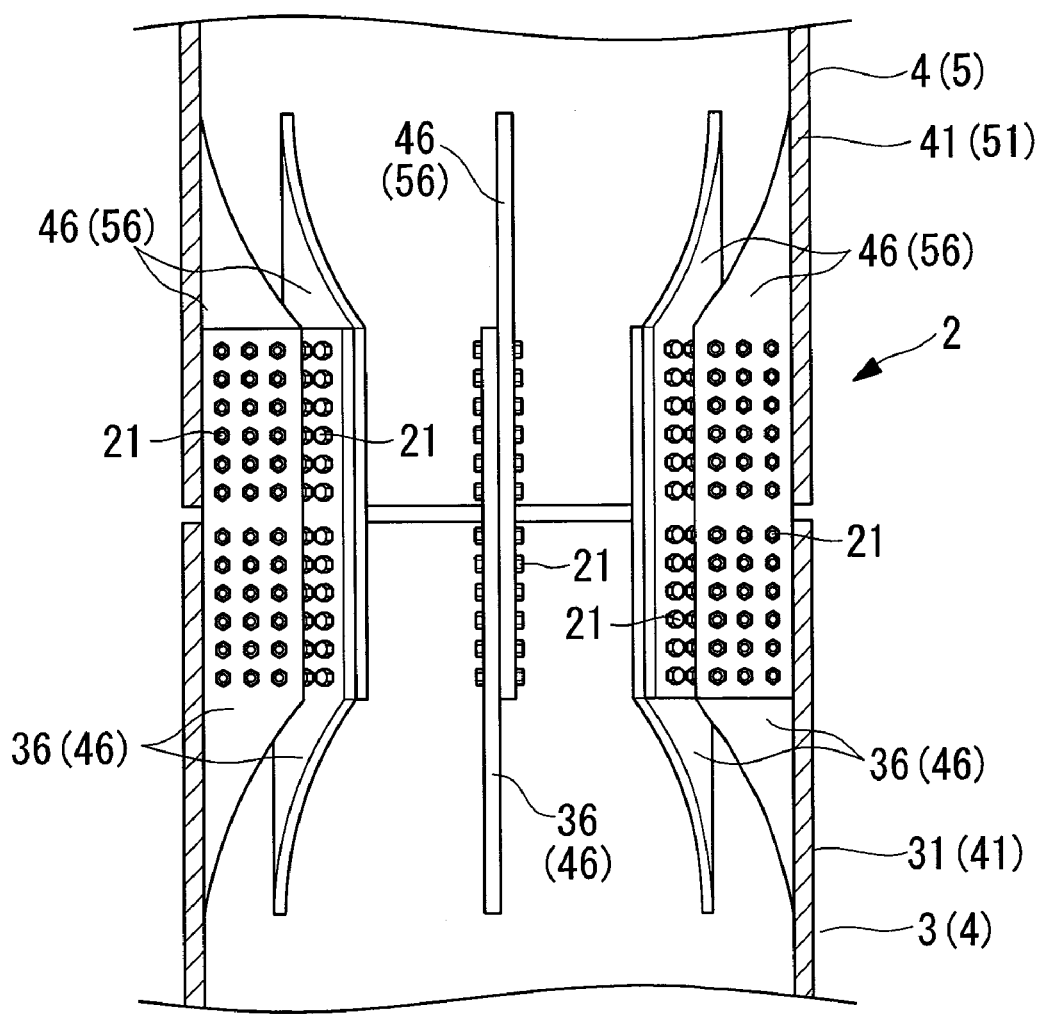
FIG. 11 is a sectional view showing a connection portion between tower sections in a wind turbine generator tower according to a ninth embodiment of the present invention.

FIG. 11 is a sectional view showing a connection portion between the tower section 3 and the tower section 4 (or between the tower section 4 and the tower section 5) in a wind turbine generator tower 2 according to a ninth embodiment of the present invention.

As shown in FIG. 11, the tower sections 3, 4, and 5 constituting the wind turbine generator tower 2 respectively include the approximately cylindrical tower section main bodies 31, 41, and 51, and approximately flat-plate-shaped coupling ribs (protruding parts) 36, 46, and 56 that are provided so as to protrude from the inner circumferential surfaces of the tower section main bodies 31, 41, and 51. In this embodiment, the eight coupling ribs 36, 46, and 56 are provided radially at regular intervals on the inner circumferential surfaces of the tower section main bodies 31, 41, and 51, respectively. The coupling ribs 36, 46, and 56 are formed so as to extend along the axial direction of the tower sections 3, 4, and 5 only at axis-wise end portions of the tower section main bodies 31, 41, and 51, respectively.

As shown in FIG. 11, each of the coupling ribs 36 that are provided so as to protrude from the inner circumferential surface at an upper end portion of the tower section main body 31 partially protrudes upward above the upper end of the tower section main body 31. Also, each of the coupling ribs 46 that are provided so as to protrude from the inner circumferential surface at a lower end portion of the tower section main body 41 partially protrudes downward below the lower end of the tower section main body 41.

The tower section 4 is disposed with respect to the tower section 3 such that each of the coupling ribs 36 of the tower section 3 and each of the coupling ribs 46 of the tower section 4 partially overlap with each other. Then, each of the coupling ribs 36 of the tower section 3 and each of the coupling ribs 46 of the tower section 4 are directly friction-jointed by the high-strength bolts 21 at the overlapping portions of the two coupling ribs 36 and 46. In this way, when eight pairs of the coupling ribs 36 and 46 are friction-jointed by the high-strength bolts 21, the tower section 4 is connected to the tower section 3.

In the same way, each of the coupling ribs 46 that are provided so as to protrude from the inner circumferential surface at an upper end portion of the tower section main body 41 partially protrudes upward above the upper end of the tower section main body 41. Also, each of the coupling ribs 56 that are provided so as to protrude from the inner circumferential surface at a lower end portion of the tower section main body 51 partially protrudes downward below the lower end of the tower section main body 51.

The tower section 5 is disposed with respect to the tower section 4 such that each of the coupling ribs 46 of the tower section 4 and each of the coupling ribs 56 of the tower section 5 partially overlap with each other. Then, each of the coupling ribs 46 of the tower section 4 and each of the coupling ribs 56 of the tower section 5 are directly friction-jointed by the high-strength bolts 21 at the overlapping portions of the two coupling ribs 46 and 56. In this way, when eight pairs of the coupling ribs 46 and 56 are friction-jointed by the high-strength bolts 21, the tower section 5 is connected to the tower section 4.

As shown in FIG. 11, the coupling ribs 36, 46, and 56 are formed so as to have a protrusion height that is gradually reduced as the distance increases from the overlapping portions between the coupling ribs 36 and 46 or between the coupling ribs 46 and 56. Accordingly, the load is smoothly transferred between the tower section main bodies 31, 41, and 51 and the coupling ribs 36, 46, and 56, and thus stress concentration is relieved.

Tenth Embodiment

Figure 12:
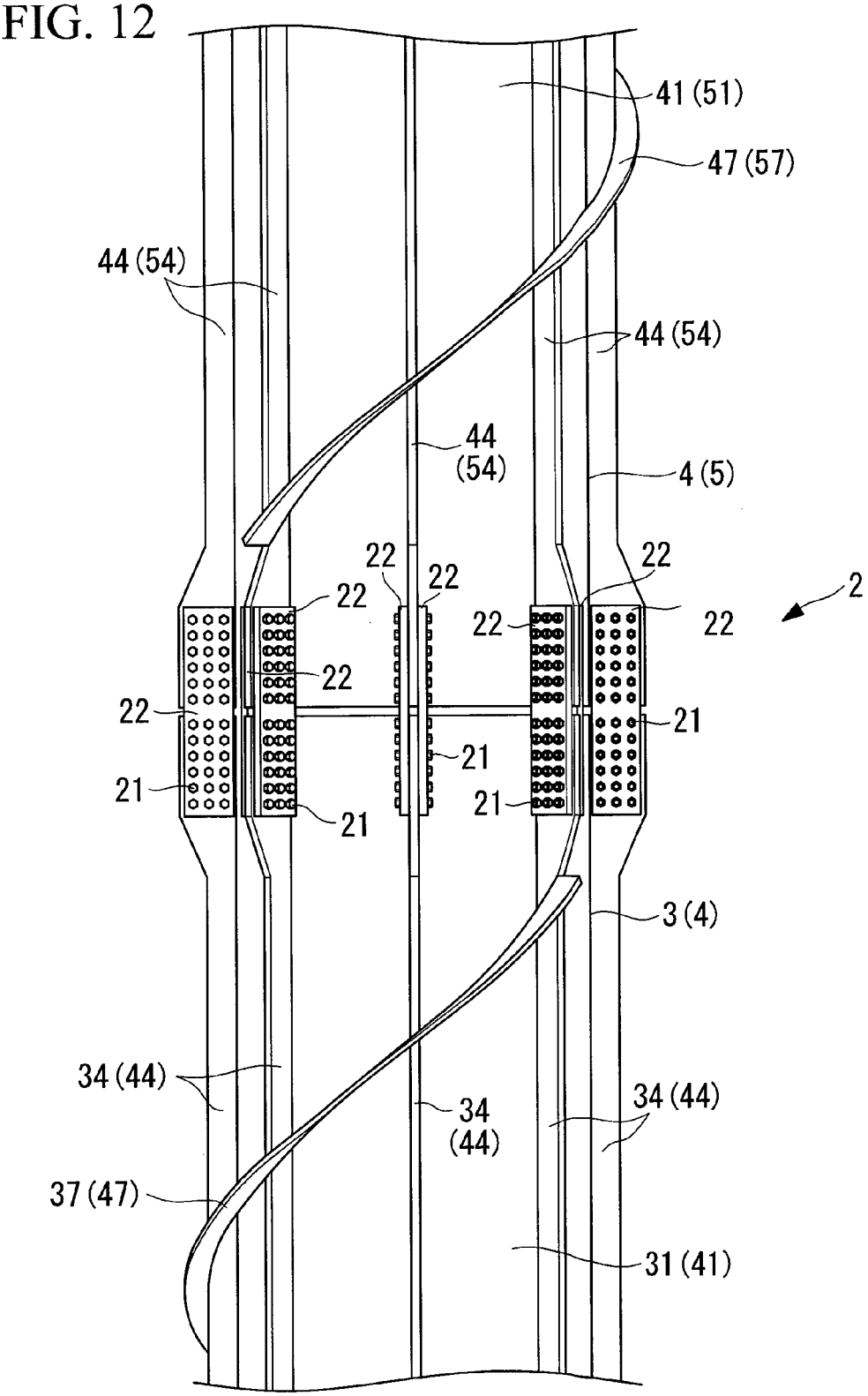
FIG. 12 is a sectional view showing a connection portion between tower sections in a wind turbine generator tower according to a tenth embodiment of the present invention.

FIG. 12 is a sectional view showing a connection portion between the tower section 3 and the tower section 4 (or between the tower section 4 and the tower section 5) in a wind turbine generator tower 2 according to a tenth embodiment of the present invention.

As shown in FIG. 12, as in the wind turbine generator tower 2 of the third embodiment, the tower sections 3, 4, and 5 constituting the wind turbine generator tower 2 respectively include the approximately cylindrical tower section main bodies 31, 41, and 51, and the eight approximately flat-plate-shaped longitudinal ribs (protruding parts) 34, 44, and 54 that are provided so as to protrude from the outer circumferential surfaces of the tower section main bodies 31, 41, and 51. Further, in this embodiment, helical fins 37, 47, and 57 are attached to the longitudinal ribs 34, 44, and 54, provided so as to protrude from the outer circumferential surfaces of the tower section main bodies 31, 41, and 51, so as to run around the outer circumference of the tower section main bodies 31, 41, and 51, respectively.

According to the wind turbine generator towers 2 described above in the first to tenth embodiments, the tower section 3 and the tower section 4 are connected by friction-jointing the longitudinal ribs 32 and 34 and/or the coupling ribs 33, 35, and 36 of the tower section 3 and the longitudinal ribs 42 and 44 and/or the coupling ribs 43, 45, and 46 of the tower section 4 by the high-strength bolts. In the same way, the tower section 4 and the tower section 5 are connected by friction-jointing the longitudinal ribs 42 and 44 and/or the coupling ribs 43, 45, and 46 of the tower section 4 and the longitudinal ribs 52 and 54 and/or the coupling ribs 53, 55, and 56 of the tower section 5 by the high-strength bolts. Therefore, it is not necessary to provide expensive flanges at axis-wise end portions of the respective tower sections 3, 4, and 5, in order to connect the tower sections 3, 4, and 5.

Further, when a bending force acts on the wind turbine generator tower 2 due to the wind force etc., the high-strength bolts 21 give just the fastening force that is required to produce a frictional force between the friction-jointed longitudinal ribs 32, 34, 42, 44, 52, and 54 or between the friction-jointed coupling ribs 33, 35, 36, 43, 45, 46, 53, 55, and 56. Therefore, an additional load is not imposed on the bolts, unlike in a case where flanges provided at axis-wise end portions of the tower sections 3, 4, and 5 are jointed by bolts.

Further, the longitudinal ribs 32, 34, 42, 44, 52, and 54 or the coupling ribs 33, 35, 36, 43, 45, 46, 53, 55, and 56 can serve a role of enhancing the rigidity of the tower section main bodies 31, 41, and 51, in addition to the role of connecting the tower sections 3, 4, and 5.

Furthermore, according to the wind turbine generator tower 2 described in the first embodiment, the third embodiment, the fifth embodiment, the seventh embodiment, the eighth embodiment, or the tenth embodiment, the longitudinal ribs 32, 34, 42, 44, 52, and 54, which are formed so as to extend along the whole axial length of the tower section main bodies 31, 41, and 51, can improve the buckling resistance of the wind turbine generator tower 2.

As a result, the plate thickness of the tower section main bodies 31, 41, and 51 that is required to ensure the buckling resistance of the wind turbine generator tower 2 can be relatively reduced, and thus the cost required to construct the wind turbine generator tower 2 can be reduced.

Furthermore, according to the wind turbine generator tower 2 described in the second embodiment, the fourth embodiment, or the ninth embodiment, since the coupling ribs 33, 35, 36, 43, 45, 46, 53, 55, and 56, which are required to connect the tower sections 3, 4, and 5, are formed only at the connection portions between the tower sections 3 and 4 and between the tower sections 4 and 5, the cost required to form the coupling ribs 33, 35, 36, 43, 45, 46, 53, 55, and 56 can be minimized.

Since the coupling ribs 33, 35, 36, 43, 45, 46, 53, 55, and 56 are formed to have a protrusion height that is gradually reduced from the axis-wise end portions of the tower section main bodies 31, 41, and 51 toward the axis-wise center portions thereof, it is possible to prevent stress transferred between the tower section main bodies 31, 41, and 51 and the coupling ribs 33, 35, 36, 43, 45, 46, 53, 55, and 56 from being concentrated at a particular location.

Furthermore, according to the wind turbine generator tower 2 described in the first embodiment or the second embodiment, since the tower sections 3, 4, and 5 are connected when the longitudinal ribs 32, 42, and 52 or the coupling ribs 33, 43, and 53 that are formed on the inner circumferential surfaces of the tower section main bodies 31, 41, and 51 are friction-jointed by the high-strength bolts 21, the friction-jointed portions cannot be seen from outside the wind turbine generator tower 2, and thus the outer appearance of the wind turbine generator tower 2 can be kept simple.

Furthermore, according to the wind turbine generator tower 2 described in the third embodiment or the fourth embodiment, since the tower sections 3, 4, and 5 are connected when the longitudinal ribs 34, 44, and 54 or the coupling ribs 35, 45, and 55 that are formed on the outer circumferential surfaces of the tower section main bodies 31, 41, and 51 are friction-jointed by the high-strength bolts 21, the longitudinal ribs 34, 44, and 54 or the coupling ribs 35, 45, and 55 can be reduced in cross section compared with the wind turbine generator tower 2 of the first embodiment or the second embodiment, in which the longitudinal ribs or the coupling ribs are formed on the inner circumferential surfaces of the tower section main bodies 31, 41, and 51. As a result, the number of high-strength bolts 21 required for the friction joints can be reduced.

Also, a large usage space can be provided in the wind turbine generator tower 2.

Further, the longitudinal ribs 34, 44, and 54 or the coupling ribs 35, 45, and 55 that are formed on the outer circumferential surfaces of the tower section main bodies 31, 41, and 51 can be utilized as supporting members for providing the work platforms 9 etc. on the outer side of the wind turbine generator tower 2.

Furthermore, according to the wind turbine generator tower 2 described in the fifth embodiment, the sixth embodiment, the seventh embodiment, or the eighth embodiment, since the surfaces of the friction joints using the high-strength bolts 21 are separately provided on the inner circumferential surface sides and the outer circumferential surface sides of the tower section main bodies 31, 41, and 51, stress concentration can be reduced in the wind turbine generator tower 2.

Furthermore, according to the wind turbine generator towers 2 described in the first to eighth embodiments, the longitudinal ribs 32, 34, 42, 44, 52, and 54 or the coupling ribs 33, 35, 36, 43, 45, 46, 53, 55, and 56 are friction-jointed by the high-strength bolts 21 via the splice plates 20 and 22 that are provided so as to sandwich, from both sides, the facing portions of the longitudinal ribs 32, 34, 42, 44, 52, and 54 or the coupling ribs 33, 35, 36, 43, 45, 46, 53, 55, and 56, it is possible to easily connect the longitudinal ribs 32, 34, 42, 44, 52, and 54 or the coupling ribs 33, 35, 36, 43, 45, 46, 53, 55, and 56 through friction jointing using the high-strength bolts 21.

Further, since the cores of the longitudinal ribs 32, 34, 42, 44, 52, and 54, facing each other, or the coupling ribs 33, 35, 36, 43, 45, 46, 53, 55, and 56, facing each other, are aligned in position, torsion etc. does not occur when a force is transferred between the tower sections 3, 4, and 5.

Furthermore, according to the wind turbine generator tower 2 described in the ninth embodiment, since the coupling ribs 36 of the tower section 3 and the coupling ribs 46 of the tower section 4 are directly friction-jointed by the high-strength bolts 21, and the coupling ribs 46 of the tower section 4 and the coupling ribs 56 of the tower section 5 are directly friction-jointed by the high-strength bolts 21, it is not necessary to use splice plates in order to connect the tower sections 3, 4, and 5. Therefore, the cost required to connect the tower sections 3, 4, and 5 can be reduced.

Further, in a tower-like structure, such as the wind turbine generator tower 2, an oscillation phenomenon called vortex-induced oscillation occurs due to a Karman vortex produced from the structure main body. According to the wind turbine generator tower 2 described in the tenth embodiment, since the helical fins 37, 47, and 57 are attached on the outer surfaces of the tower sections 3, 4, and 5, the vortex-induced oscillation occurring in the wind turbine generator tower 2 due to the Karman vortex can be suppressed.

Note that the wind turbine generator tower of the present invention is not limited to the above-described embodiments, and it can be appropriately modified without departing from the scope of the invention.

What is claimed is:

1. A wind turbine generator tower, comprising:
a plurality of tubular tower sections connected with each other in an axial direction of the tower, wherein each of the tower sections includes:
   a tubular tower section main body having an outer circumferential surface and an inner circumferential surface opposite to the outer circumferential surface; and
   a plurality of protruding parts extending in the axial direction and protruding from the outer circumferential surface and/or the inner circumferential surface; and
a plurality of fastening members; and
a plurality of splice plates, wherein,
among the plurality of tower sections, adjacent tower sections are connected with protruding parts of one of the adjacent tower sections and the corresponding protruding parts of the other adjacent tower section, said protruding parts being friction-jointed by the fastening members via the splice plates,
said tower section main body further includes a center portion and opposite end portions in the axial direction,
the protruding parts are arranged at the end portions of the tower section main body without extending into the center portion, and
a dimension of each of the protruding parts, in a direction perpendicular to the axial direction, is gradually reduced from the corresponding end portion toward the center portion of the tower section main body.

2. A wind turbine generator tower according to claim 1, wherein the protruding parts are formed on the inner circumferential surface of the corresponding tower section main body.

3. A wind turbine generator tower according to claim 1, wherein the protruding parts are formed on the outer circumferential surface of the corresponding tower section main body.

4. A wind turbine generator tower according to claim 1, wherein the protruding parts are formed on both the outer circumferential surface and the inner circumferential surface of the corresponding tower section main body.

5. A wind turbine generator tower according to claim 1, wherein:
end faces of the protruding parts of the one tower section and end faces of the corresponding protruding parts of the other tower section face each other; and
each of the protruding parts of the one tower section and the corresponding protruding part of the other tower section are directly sandwiched between a pair of the splice plates and friction-jointed with the fastening members via the splice plates which cover the facing end faces of the two protruding parts.

6. A wind turbine generator tower according to claim 5, wherein a dimension of each of the splice plates in the direction perpendicular to the axial direction is substantially the same as the dimension of each of the protruding parts at the corresponding end portions of the respective tower section main bodies.

7. A wind turbine generator tower, comprising:
a plurality of tubular tower sections connected with each other in an axial direction of the tower, wherein each of the tower sections includes:
   a tubular tower section main body having an outer circumferential surface and an inner circumferential surface opposite to the outer circumferential surface; and
   a plurality of protruding parts extending in the axial direction and protruding from the outer circumferential surface and/or the inner circumferential surface; and
   a plurality of fastening members; wherein, among the plurality of tower sections, adjacent tower sections are connected with the when the protruding parts of one of the adjacent tower sections and the corresponding protruding parts of the other adjacent tower section, said protruding parts being friction-jointed by the fastening members, said tower section main body further includes a center portion and opposite end portions in the axial direction,
the protruding parts are arranged at the end portions of the tower section main body without extending into the center portion, and
a dimension of each of the protruding parts, in a direction perpendicular to the axial direction, is gradually reduced from the corresponding end portion toward the center portion of the tower section main body,
the protruding parts of the one tower section protrude in the axial direction outwardly beyond the end portion of the tower section main body of the other adjacent tower section to partially overlap the corresponding with the protruding parts of the other adjacent tower section, and
the overlapping portions of the protruding parts of the one tower section and the corresponding protruding parts of the other adjacent tower section are directly friction-jointed with the fastening members.

8. A wind turbine generator tower according to claim 1, further comprising a plurality of helical fins attached on the outer circumferential surfaces of the tower section main bodies, respectively.

9. A wind turbine generator tower according to claim 8, wherein the fins are directly attached to the protruding parts which are protruding from the outer circumferential surfaces of the tower sections.

10. A wind turbine generator tower according to claim 1, wherein each of the tower sections further comprises a plurality of platforms directly supported by the protruding parts which protrude from the outer circumferential surface of the tower section main body.

* * * * *